May 21, 1963 J. J. CHISHOLM 3,090,279
INTERFEROMETER USING A DIFFRACTION GRATING
Filed May 13, 1960 3 Sheets-Sheet 3
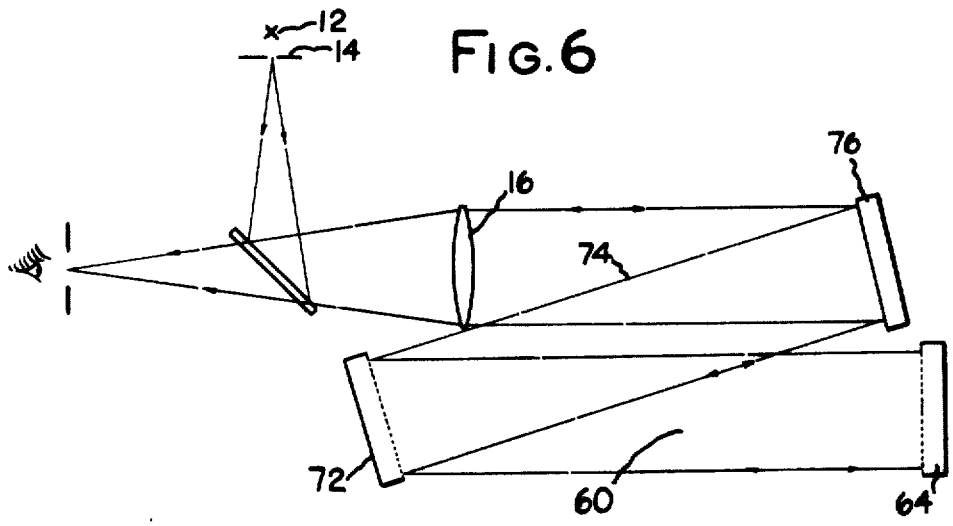
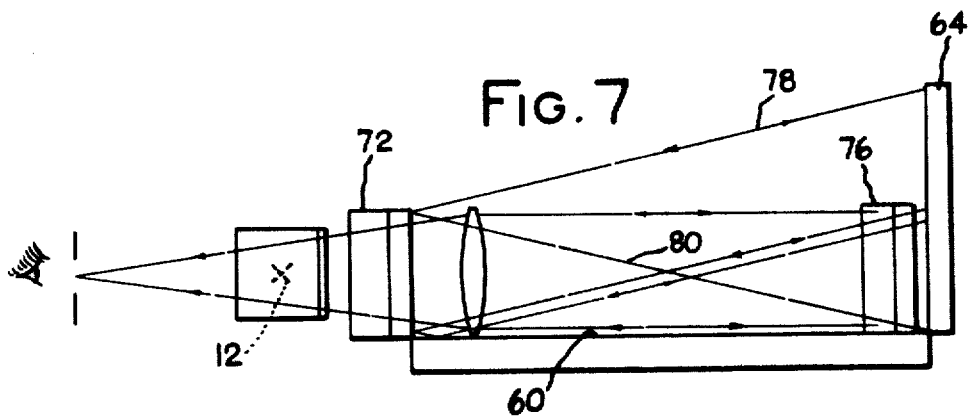
INVENTOR.
JAMES J. CHISHOLM
BY
ATTORNEYS

United States Patent Office 3,090,279
Patented May 21, 1963

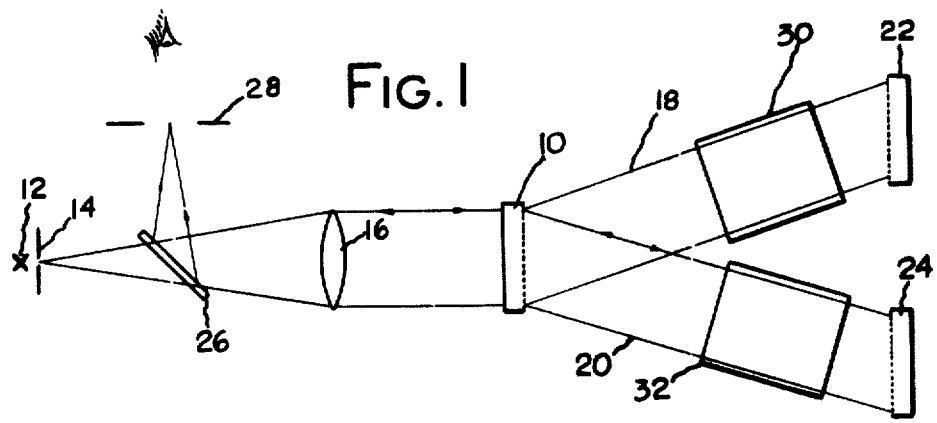
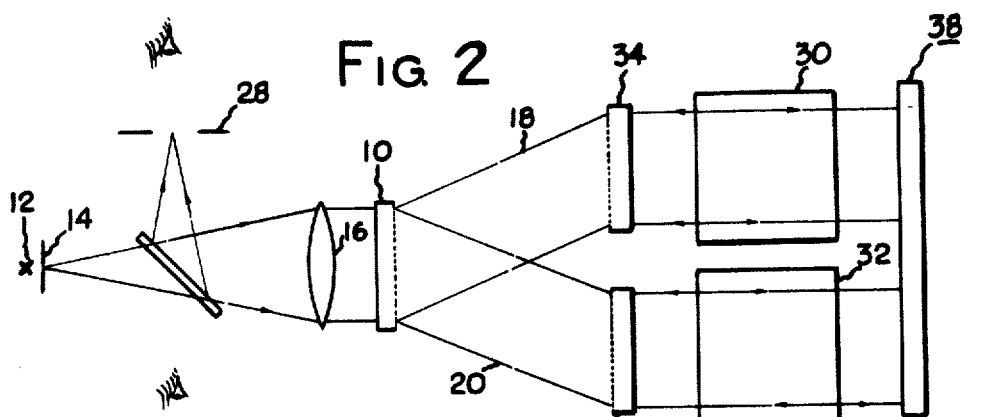
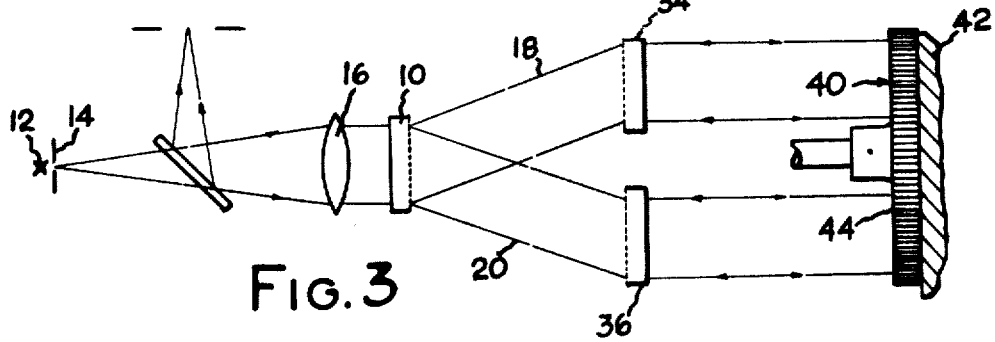

3,090,279
INTERFEROMETER USING A DIFFRACTION GRATING
James J. Chisholm, Rochester, N.Y., assignor to Bausch & Lomb Incorporated, a corporation of New York
Filed May 13, 1960, Ser. No. 29,067
5 Claims. (Cl. 88—14)

This invention relates to an improved interferometer capable of a wide variety of uses, and more particularly to an improved interferometer using a diffraction grating for dividing a beam of light into two divergent portions.

It has previously been suggested to use diffraction gratings as beam splitters and recombiners in interferometers and the like. The advantages of interferometers that employ diffraction gratings in place of the more conventional semi-silvered mirror type beam splitters are described in a paper by Weinberg et al. entitled, "Interferometer Based on Four Diffraction Gratings" published in the Journal of Scientific Instruments, volume 36, May 1959, page 227. Particular advantages are the inexpensiveness of diffraction gratings relative to flat mirrors of so-called "interferometer quality" and other ultra-high precision optical elements necessary in the more conventional types of interferometer, ease of adjustment, and insensitivity to small errors in adjustment.

The present invention is concerned with improvements in interferometers of this type, and in particular with the provision of an improved interferometer of relatively simple, inexpensive and rugged construction, which is convenient to use and capable of highly accurate and precise work.

Accordingly, one important object of the present invention is to provide an improved interferometer using a diffraction grating for dividing a light beam into two divergent portions.

Another object is to provide an improved interferometer of this type which is of relatively simple and inexpensive construction, includes a minimum number of parts, is relatively inexpensive to manufacture, easy to align and calibrate, convenient to use, and rugged and long lasting in service.

The foregoing and other objects and advantages of the invention will become apparent in the following detailed description of representative embodiments thereof, taken in conjunction with the drawings wherein:

FIG. 1 is a schematic diagram of an interferometer according to a first embodiment of the invention;

FIG. 2 is a schematic diagram of an interferometer according to a second embodiment of the invention, showing the interferometer arranged for measuring the refractive index of a material;

FIG. 3 is a schematic diagram illustrating the interferometer shown in FIG. 2 as used for measuring dimensional characteristics of a workpiece;

Figure 5:
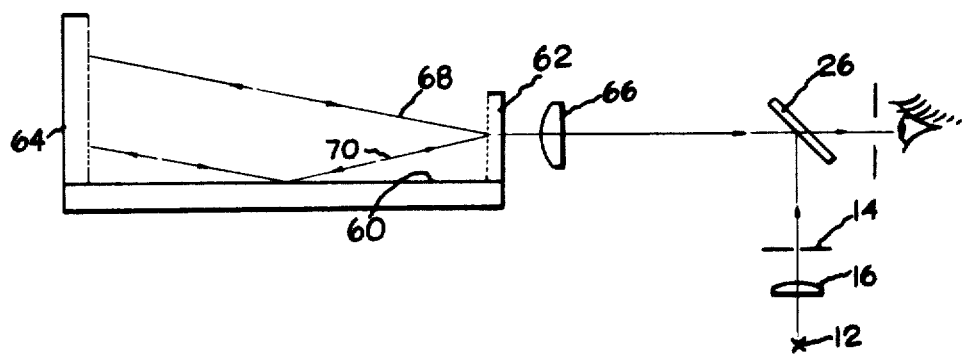
FIG. 5 is a schematic diagram illustrating an interferometer according to a third embodiment of the invention, which is especially adapted for indicating the relative flatness of a relatively large area surface.

FIG. 6 is a schematic plan view of an interferometer according to a fourth embodiment of the invention, arranged for indicating the relative flatness of a relatively large area surface similarly to the interferometer shown in FIG. 5, but using a reflection type diffraction grating as a beam splitter instead of a transmission type diffraction grating; and FIG. 7 is a side elevational view in schematic form of the interferometer shown in FIG. 6.

The simplest form of interferometer according to the present invention comprises a single grating for dividing a beam of light into two divergent coherent portions, one or more reflecting surfaces, which may be the surface or surfaces of a workpiece, for reflecting the divergent beams back toward the grating for recombination thereat into a single return beam, and means for observing interference effects in the return beam. The interferometer is used in conjunction with a source of collimated light, which source may, if desired, be incorporated in the instrument and built into the same housing with the grating. The reflecting surface, or surfaces may be separately mounted, or mounted on the same base support with the grating, as desired, depending upon the use to which the interferometer is to be put.

One embodiment of the invention is the relatively simple interferometer illustrated in FIG. 1, and includes a transmission type diffraction grating 10. Light emitted from a source 12 through a slit or pinhole 14 is collimated by a collimating lens 16 and directed toward the grating 10 normally incident thereto. The grating 10 is preferably selected to be of the type which concentrates its output about evenly in two desired orders angularly spaced one from the other. These orders may be, for example, the two first orders on opposite sides of the zero order. The light is thus split by the grating 10 into two divergent coherent beams 18 and 20.

Reflectors, preferably in the form of reflection type diffraction gratings 22 and 24 are positioned in the paths of the two beams 18 and 20, respectively, for reflecting the beams 18 and 20 back toward the main grating 10. Light reflected from the reflection gratings 22 and 24 is recombined at the main grating 10, passes back through the collimating lens 16 to the half-silvered mirror 26 and is imaged in an image plane 28 where interference effects may be observed, either directly or with the aid of an eyepiece (not shown).

The light source 12, together with the collimator 16, and the beam splitter 26 are not essential or critical parts of the interferometer. They may be varied as desired, and other illuminating and viewing means substituted therefor according to choice. It should be particularly noted that the beam splitting mirror 26 need not be of optical quality, because it serves solely to separate the entering light from the emergent light, and has no effect on the interference phenomenon. Imperfections in the mirror 26 can affect only the quality of the fringe images as seen in the image plane 28.

As shown, the interferometer is arranged for measuring the refractive index of a test specimen 30 by measuring the optical path difference between the first divergent beam 18, which passes through the test specimen 30, and the second divergent beam 20, which passes through a reference specimen 32. The path difference is indicated by interference fringes, which may be observed and counted in the image plane 28. The light source 12 may be either monochromatic or white, in which latter case, one or more compensators (not shown) are placed in the paths of the divergent beams 18 and 20 in accordance with conventional practice to compensate for path length differences caused by differences between the test and reference specimens 30 and 32, respectively, thus to equalize the path lengths and provide a so-called null indication.

The reflection gratings 22 and 24 may be replaced by plane mirrors disposed perpendicularly to the respective divergent beams 18 and 20. The use of the gratings 22 and 24 is preferred for ease of alignment, since, as explained in the hereinabove identified paper, the gratings are relatively insensitive to small errors in adjustment. As easily seen from the fundamental grating equation, the reflection gratings 22 and 24 must have one half the line spacing of the main grating 10 if they are to be arranged parallel to the main grating 10.

Greater convenience in operation may be achieved by rendering the two divergent beams 18 and 20 parallel to each other, as in the interferometer shown in FIG. 2, before passing them through the test specimen 30 and the reference specimen 32. In the interferometer shown in FIG. 2, the divergent beams 18 and 20, which emerge from the main grating 10 are intercepted by, and pass through a pair of transmission type diffraction gratings 34 and 36, which are positioned in a common plane parallel to and spaced from the main grating 10. The beams 18 and 20 are diffracted into spaced apart parallel paths by the gratings 34 and 36, and are reflected back through the auxiliary gratings 34 and 36 to the main grating 10 by a plane mirror 38. The separation of the parallel portions of the paths of the divergent beams 18 and 20 may be controllably varied by adjusting the spacing between the main grating 10 and the transmission gratings 34 and 36.

As shown, the interferometer illustrated in FIG. 2 is arranged for measuring the refractive index of, or atmospheric disturbances in or adjacent to the test specimen 30, e.g. thermal gradients or turbulence, and produces fringe patterns exactly similar to those produced by previous conventional types of interferometers. Relatively extensive literature is available relative to the evaluation of such fringe patterns and to their significance in terms of the actual physical phenomena under observation.

The interferometer illustrated in FIG. 2 is also shown in FIG. 3 arranged for measuring the thickness variations of a workpiece 40, which is positioned against and preferably wrung to a flat rigid support 42, and the front surface 44 of which serves as a reflector for reflecting the divergent beams back toward the main grating 10.

Figure 4:
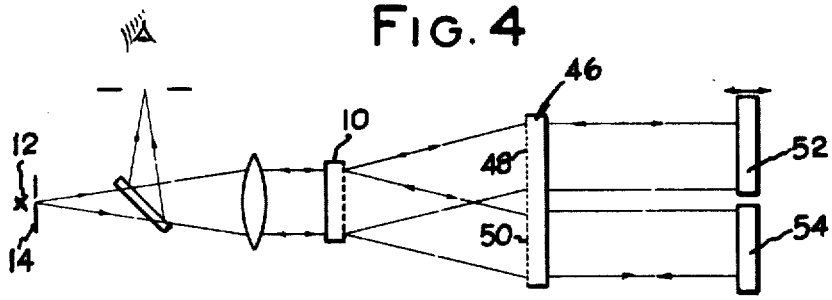
FIG. 4 is a schematic diagram illustrating the interferometer shown in FIGS. 2 and 3 as used for measuring movement of a workpiece.

In FIG. 4 the interferometer is shown with a single auxiliary grating 46, which has about twice the area of the main grating 10 so that its two portions 48 and 50 function similarly to the two separate gratings 34 and 36 of the interferometer shown in FIG. 3. In FIG. 4, the interferometer is shown as arranged for measuring the travel or position of a test specimen 52 relative to a reference 54. The advantages of this arrangement lie in the positive avoidance of misalignment between the two auxiliary gratings 34 and 36, the substantial elimination of possible differences between their optical characteristics, and simplification of the mounts required for supporting them. In the event two separate gratings are used, as shown in FIGS. 2 and 3 for example, it is preferred that replicas made from the same master ruling be used in order to minimize differences in the optical characteristics.

The practice of the invention is thought to be broadly applicable to a wide range of interferometry, as will be apparent to those skilled in the art. The interferometers shown in FIGS. 1–4, for example, may be readily adapted for various different uses by suitable choice of specimen and reference sample arrangements.

An interferometer according to another embodiment of the invention is illustrated in FIG. 5 arranged for measuring the flatness and general surface configuration of a relatively large area surface 60. This interferometer comprises a transmission type grating 62 mounted in spaced confronting relationship to a reflection type grating 64. The reflection grating 64 is of the same length as the main grating 62, but is approximately twice as wide (the width being the vertical dimension in the drawing, and the length being taken perpendicular to the plane of the drawing) and its line spacing is one-half the line spacing of the main grating 62, that is, the length of the lines of the reflection grating 64 is about same as the length of the lines of the main grating 62, but the lines of the reflection grating 64 are half as far apart, and the total area of the reflection grating 64 is at least about twice the total effective area of the main grating 62.

In this interferometer, light from the source 12 passes through a condensing lens 16, through a pinhole 14, and is reflected by a half-silvered mirror 26 through a collimating lens 66 to the main grating 62. The main grating 62 splits the light into two divergent beams 68 and 70. The two gratings 62 and 64 are positioned at opposite ends of the surface 60 to be investigated, and are supported thereon approximately perpendicularly thereto. The first, or upper divergent beam 68 travels directly to the reflection grating 64, and is reflected back along the same path to the main grating 62. The second beam 70 strikes the surface 60 at a relatively small glancing angle and is reflected from the surface to the reflection grating 64. The glancing angle is determined by the characteristics of the grating 62, particularly its line spacing and the diffraction order of the beam 70. The glancing angle of the beam 70 may be varied either by substituting a different grating, having a different line spacing for the grating 62, or by using an emergent beam of a different diffraction order.

The glancing angle of the beam 70 relative to the surface 60 determines the calibration of the interferometer, and the grating 62 is preferably selected to produce a glancing angle such that each fringe represents a surface variation of a desired magnitude such as, for example, 10 or 100 micro inches. The calculations for this determination are straightforward as shown by the following computation of the grating line spacings required for a 100 microinch calibration, based on the use of a light source having its principal emission at a wavelength of $\lambda = 5.461 \times 10^{-4}$ mm. (the mercury green line).

It will be immediately apparent from a consideration of FIG. 5 that a deviation in the elevation of the surface 60 will effect a change, $\Delta p$, in the length of the path traversed by the lower divergent beam 70 (taking both directions of travel into account) amounting to $$\Delta p = 4nd \sin B$$

where $n$ is the refractive index of the ambient
$d$ is the deviation of the surface 60
$B$ is the glancing angle of the lower divergent beam 70 relative to the surface 60.

A new fringe will appear (or disappear) each time $$4nd \sin B = \lambda$$

where $\lambda$ is the wavelength of the light. Solving this equation for $d = 100$ microinch, or $2.54 \times 10^{-4}$ cm., where $n = 1$ (air atmosphere):

$$\sin B = \frac{\lambda}{4 \times 2.54 \times 10^{-4} \text{ cm.}} = \frac{5.461 \times 10^{-5}}{4 \times 2.54 \times 10^{-4}} = .05375$$

and, $B = \sin^{-1} .05375$.

In the arrangement shown, the glancing angle B is the same as the diffraction angle of the two gratings 62 and 64. The grating equation is:

$$\frac{m\lambda}{na} = \sin \alpha s \pm \text{in } B$$

where, $m$ is the order of diffraction (assume first order)
$n$ is the refractive index of the ambient (assume air, where $n=1$)
$a$ is the line spacing of the grating
$\alpha$ is the angle of incidence
$B$ is the diffraction angle For the transmission type grating 62, then:

$$a = \frac{\lambda}{\sin B}$$

since $m=1$, $n=1$, and $\alpha=0$. Then $$a = \frac{5.461 \times 10^{-4}}{.05375} = 10.16 \times 10^{-3}$$

and the transmission type grating 62 must have $$10^3/10.16$$

or 98.5 lines per mm.

The reflection type grating 64 is mounted Littrow, that is, its angles of incidence and diffraction are equal, so that, for this grating, $$\alpha = B, \text{ and } a = \frac{\lambda}{2 \sin B} = \frac{5.461 \times 10^{-5}}{2 \times (.05375)} = 5.08 \times 10^{-4} \text{ mm}.$$

Similar calculations may be made to select gratings for any desired calibration of the instrument.

If the surface 60 is perfectly flat, there will be so-called zero order interference between the two beams 68 and 70 upon their return and recombination at the grating 62, since the path lengths of the two beams will be exactly equal. Any irregularity in the surface 60 serves to change the path length of at least a portion of the second beam 70 relative to the path length of the first beam 68, thereby creating interference effects in the return beam.

Preferably, the two gratings 62 and 64 are tilted slightly out of perpendicular relative to the surface 60 in order to introduce a wedge effect into the system, thereby to produce a reference pattern of parallel, straight fringes. The direction of the wedge, that is, the direction of the relative tilt between the gratings 62 and 64 and the surface 60 determines the angular orientation of the reference fringes as seen in the field of view. Small irregularities in the surface 60 will then be indicated by deflection of the straight reference fringes as in a contour map.

FIGS. 6 and 7 illustrate yet another embodiment of the invention comprising an interferometer arranged for investigating a relatively large area surface 60 similarly to the interferometer shown in FIG. 5, but using a reflection type diffraction grating 72 for beam splitting in place of the transmission type grating 62. The arrangement is generally similar to the arrangement of FIG. 5 except that the main grating 72 is rotated about a vertical axis, that is, about an axis normal to the surface 60 in order to direct the divergent beams 78 and 80 toward the reflection grating 64. The system may be arranged for direct viewing, or, as shown, the system may be folded and include a plane mirror 76 for reflecting light toward the grating 72 from the collimating lens 16.

What is claimed is:

1. An interferometer comprising a diffraction grating for receiving collimated light and dividing light so received into two divergent beams, and a Littrow mounted reflection type diffraction grating spaced from the first said grating for reflecting said divergent beams back toward the first said grating for recombination thereat into a single return beam, said reflection type grating being disposed generally parallel to the first said grating and having substantially twice the line density thereof, whereby the useful diffracted ray which is reflected from the reflection type grating is caused to leave the grating along the path of the ray which is incident thereon.

2. An interferometer for measuring the flatness of relatively large area surfaces comprising a pair of diffraction gratings arranged in spaced confronting relationship, means for supporting said gratings adjacent and generally perpendicular to the surface to be measured, one of said gratings being constructed to diffract from an incident beam a pair of divergent beams of a single order at an included angle which is designated A, one of said pair of beams being projected undeviated upon the other grating and the other of said pair of beams impinging upon said surface at a glancing angle thereto and being deviated thereby parallel to the undeviated beam onto said other grating, the parallel undeviated and the deviated beams both being incident on the ruled face of the grating at an angle A/2 with respect to a normal to said face, the line density of said other grating being twice the line density of the first said grating in agreement with the mathematical relationship stated in the two expressions herebelow.

$$a = \frac{\lambda}{\sin B}$$

for the first said grating, $$a = \frac{\lambda}{2 \sin B}$$

for the said other grating, wherein $a$ designates the line density of the grating, and B designates the diffraction angle, whereby said parallel deviated and undeviated beams are retro-directed back to the first grating.

3. An interferometer for measuring the flatness of relatively large area surfaces as set forth in claim 2 and further characterized by first one of said gratings being a transmission type grating, the second one of said gratings being a reflection type grating.

4. An interferometer for measuring the flatness of relatively large area surfaces as set forth in claim 2 and further characterized by both of said gratings being Littrow mounted reflection type gratings and being arranged with their diffraction lines in common planes generally parallel to the surface to be measured, the first one of said gratings being angularly offset relative to parallelism with the second one thereof about an axis perpendicular to the diffraction lines.

5. An interferometer for measuring the flatness of relatively large area surfaces as set forth in claim 2 and further characterized by said gratings being slightly tilted out of perpendicularity with said surface whereby a wedge effect is introduced into the interferometer to produce a reference fringe pattern in the field of view.

References Cited in the file of this patent

Connes: "Principe et Realization d'un Nouveau Type de Spectrometre Interferential," Revue d'Optique, vol. 38, April 1959, pp. 185, 186, 197–200 relied on. Complete article covers pages 157–200.

Weinberg et al.: "Interferometer Based on Four Diffraction Gratings," Journal of Scientific Instruments, vol. 36, May 1959, pp. 227–230.

NBS, "Interferometer Tests for Large Surfaces," Instruments and Control Systems, vol. 32, May 1959, p. 634.

UNITED STATES PATENT OFFICE
CERTIFICATE OF CORRECTION

Patent No. 3,090,279 May 21, 1963

James J. Chisholm

It is hereby certified that error appears in the above numbered patent requiring correction and that the said Letters Patent should read as corrected below.

Column 4, lines 57 to 59, for that portion of the equation reading "in" read -- sin --; column 6, line 31, after "by" insert -- the --.

Signed and sealed this 3rd day of December 1963.

(SEAL)
Attest:

ERNEST W. SWIDER
Attesting Officer

EDWIN L. REYNOLDS

Acting Commissioner of Patents